2,402,348

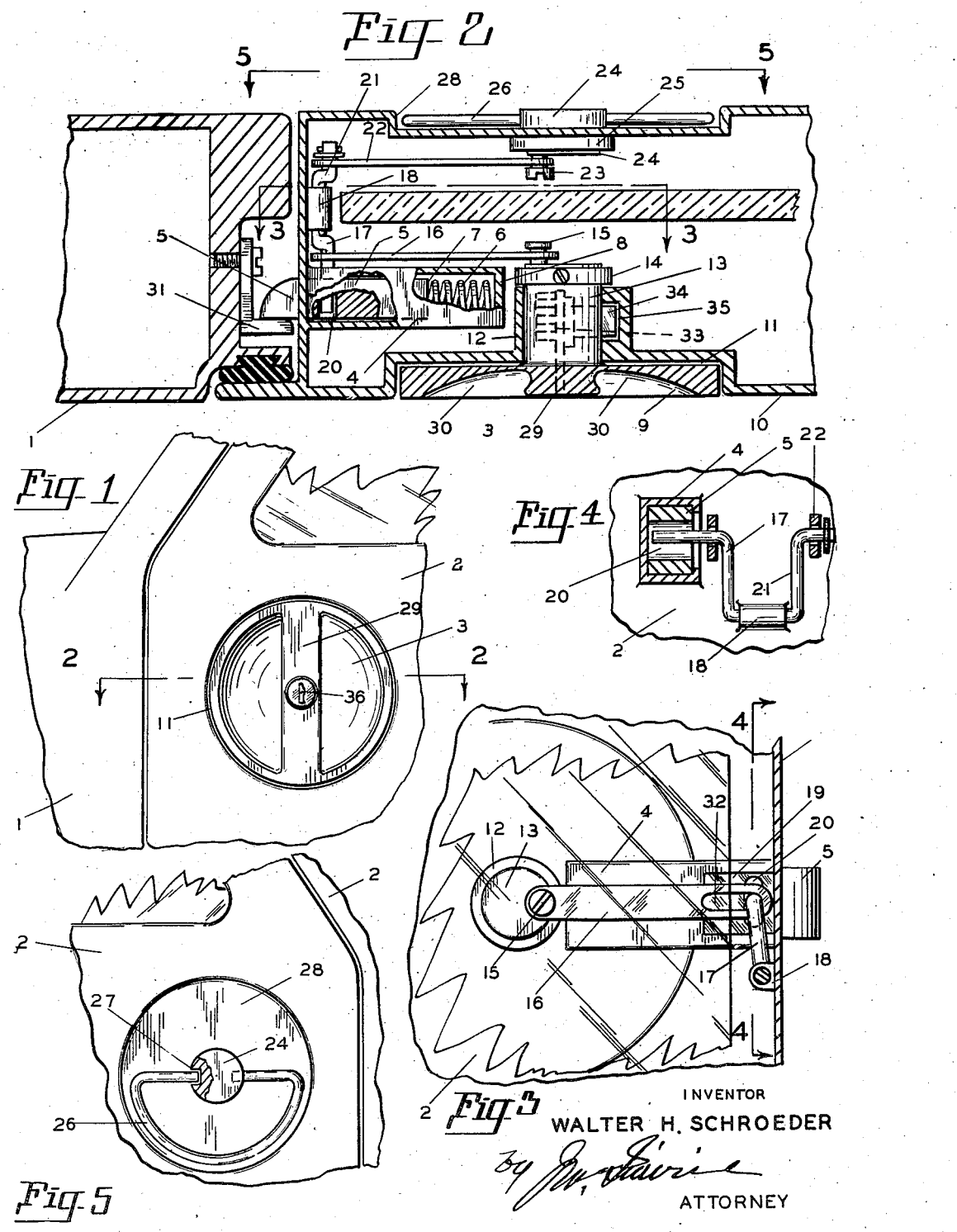
June 18, 1946. W. H. SCHROEDER 2,402,348
DOOR LATCH FOR AUTOMOBILES
Filed Sept. 5, 1944
INVENTOR
WALTER H. SCHROEDER
ATTORNEY Patented June 18, 1946

UNITED STATES PATENT OFFICE 2,402,348

DOOR LATCH FOR AUTOMOBILES

Walter H. Schroeder, Portland, Oreg.

Application September 5, 1944, Serial No. 552,736

2 Claims. (Cl. 292—164)

This invention relates to door latches and is particularly adapted to automobile doors and the like.

The primary object of the invention is to provide a latch whose operating parts are flush or even with the surrounding surface of the door and body of the automobile.

Due to the modern streamlining of automobiles and airplanes, it is most desirable to design a latching mechanism for the doors and openings that will be flush with the surrounding surface, which my drawing, specification and claims will more fully illustrate, describe and claim.

Referring to the drawing:

Figure 1 is a fragmentary side view of an automobile door, having my new and improved latch mounted therein.

Figure 2 is a fragmentary sectional view, taken on line 2—2 of Figure 1, parts broken away for convenience of illustration.

Figure 3 is a fragmentary sectional view, taken on line 3—3 of Figure 2, looking in the direction indicated.

Figure 4 is a fragmentary sectional view, taken on line 4—4 of Figure 3.

Figure 5 is a fragmentary view, taken on line 5—5 of Figure 2, looking in the direction indicated.

In the drawing:

1 indicates the body of an automobile, having the usual door 2 held in latched and closed position by my new and improved door latch 3. Mounted within the door is a tubular casing 4, having a latch bar 5 slidably mounted therein. The latch bar is forced into the position shown in Figure 2 by the spring 6, having one of its ends bearing against the end 7 of the latch bar 5, and its opposite end against the end 8 of the casing 4.

In order to pull the latch bar from the locked position I provide an outer knob 9, which is flush with the surface 10 of the door. The knob 9 is countersunk into the door within the socket portion 11 and journaled within a suitable bearing 12. The knob 9 is journaled within the bearing 12 by a hub 13 extending through the bearing 12 and held in place by a locking collar 14.

Extending outwardly from the hub 13 is a crank pin 15, upon which is pivotally mounted a connecting link 16 which extends to the crank 17. The crank 17 is pivotally mounted at 18 and extends through the opening 19 of the casing 4 and into the slot 20 within the locking bar 5. An additional crank 21 forms part of the crank 17 and has a connecting link 22 pivotally mounted thereon. The connecting link 22 extends to the crank pin 23, which is fixed to the hub 24, forming part of the knob or handle located on the inside of the door.

I have illustrated a modified knob which consists of a hub 24 journaled within a suitable bearing 25. A loop 26 provides a hand hold for rotating the hub 24 and is pivotally mounted within the hub 24 at 27 and normally rests within the countersunk portion 28 of the door.

I will now describe the operation of my new and improved door latch and lock. A cross bar 29 forms part of the knob 9, countersunk spaces 30 providing access to the cross bar by the operator. By grasping the bar 29 the knob 3 can be revolved causing the crank pin 15 to pull the link 16 and the crank arm 17 towards the hub 13, thereby pulling the locking bar 5 out of engagement with the stop 31 and against the spring 6. On releasing the cross bar 29 of the knob 3, the spring 6 will force the locking bar into latching position. The same action can be obtained by revolving the hub 24 of the inner knob by the loop 26, which will pull the crank arm 21 and 17 in a direction to pull the latching bar 5 away from the stop 31. The links 16 and 22 are formed at the crank-engaging ends with slots 32, as indicated in Figure 3 to permit latch opening movement of either link without disturbing or requiring movement of the other link. Therefore, the latch may be opened from inside the automobile while the latch operating means at the outside of the automobile is under the influence of the locking means to be described.

I have provided a means of locking my latch by enclosing a suitable well known lock mechanism within the knob 3 as indicated by the dotted lines 33 and the locking bar 34 working within the bearing housing 35 and having a key entry as indicated at 36.

From the above description and disclosure made in the drawings, it is evident that the primary object of my invention is carried out with a mechanism simple of construction for operating the latch on automobile doors, wherein all of the mechanism, knobs and so forth are flush with the surrounding surface.

I do not wish to be limited to the exact mechanical construction as illustrated, as other mechanical equivalents may be used, still coming within the scope of my claims.

I claim:

1. A door latch for automobile doors or the like, wherein the door is formed in each surface with a depression, a latch casing fixed within the door, a latch in the casing to be projected beyond one end of the door for latching purposes, a spring in the casing normally engaging the latch and maintaining it in latching position, a crank shaft pivotally mounted in the door at one side of the casing, said shaft having a crank projecting through the casing and operating in a slot extending transversely of the latch, a second crank formed on said crank shaft and extending in a direction away from the casing, a first link connecting the latch engaging crank, a second link directly connecting the second crank of the crank shaft, an operating member rotatably mounted in the depression in the outer side of the door, a pin eccentrically mounted on said operating member, said first link being connected to said eccentric pin, a second operating member rotatably mounted in the depression on the inner side of the door and an operating connection between said second operating member and the second crank, whereby either operating member may be utilized to withdraw the latch from latching position at will.

2. A construction as defined in claim 1 wherein the operating member in the outside of the door is provided with a hub extending inwardly of the door and terminating substantially in line with that wall of the casing remote from the outer surface of the door, said hub carrying the eccentric pin to which the first link is connected whereby said first link operates in parallelism with the casing in the opening operation of the door latch.

WALTER H. SCHROEDER.